US012578750B2

(12) United States Patent
Salmani et al.

(10) Patent No.: US 12,578,750 B2
(45) Date of Patent: Mar. 17, 2026

(54) OPTICAL CROSSBAR ARRAY WITH COMPENSATION AND ASSOCIATED METHOD

(71) Applicant: HUAWEI TECHNOLOGIES CO., LTD., Shenzhen (CN)

(72) Inventors: Mahsa Salmani, Vaughan (CA); Armaghan Eshaghi, Aurora (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 713 days.

(21) Appl. No.: 17/958,998

(22) Filed: Oct. 3, 2022

(65) Prior Publication Data

US 2024/0126319 A1 Apr. 18, 2024

(51) Int. Cl.
*G06E 1/04* (2006.01)

(52) U.S. Cl.
CPC .................................... *G06E 1/045* (2013.01)

(58) Field of Classification Search
CPC ........ G06E 1/045; G06E 3/008; G06N 3/0675
See application file for complete search history.

(56) References Cited

U.S. PATENT DOCUMENTS

| | | | | |
|---|---|---|---|---|
| 5,940,529 | A | 8/1999 | Buckley | |
| 7,849,122 | B2 | 12/2010 | Fiorentino et al. | |
| 10,670,860 | B2 * | 6/2020 | Tait | G02B 27/0012 |
| 10,671,434 | B1 | 6/2020 | Gold et al. | |
| 11,562,221 | B2 * | 1/2023 | Abel | G11C 13/0011 |
| 12,314,842 | B2 * | 5/2025 | Nguyen | G06N 3/063 |
| 2019/0324205 | A1 * | 10/2019 | Sharma | G02B 6/12019 |
| 2020/0019851 | A1 * | 1/2020 | Mehrabian | G06N 3/067 |
| 2020/0028074 | A1 * | 1/2020 | Defferriere | H10N 70/8836 |
| 2021/0201126 | A1 * | 7/2021 | Meng | G02F 3/00 |
| 2022/0012013 | A1 * | 1/2022 | Sebastian | G06E 3/003 |
| 2022/0044092 | A1 * | 2/2022 | Pleros | G06N 3/063 |
| 2022/0044100 | A1 * | 2/2022 | Yoo | G06N 3/063 |
| 2022/0263582 | A1 * | 8/2022 | Ma | G02F 1/225 |
| 2023/0051113 | A1 * | 2/2023 | Li | G02F 1/035 |
| 2023/0152667 | A1 * | 5/2023 | Miscuglio | G06E 3/003 359/107 |
| 2023/0306253 | A1 * | 9/2023 | Dobos | G06N 3/067 |
| 2024/0202523 | A1 * | 6/2024 | Pavesi | G06N 3/0675 |
| 2024/0370050 | A1 * | 11/2024 | Youngblood | G06N 3/0675 |
| 2024/0419951 | A1 * | 12/2024 | Li | G06N 3/0675 |
| 2025/0103873 | A1 * | 3/2025 | Xu | G06N 3/048 |

OTHER PUBLICATIONS

Joshi et al. Accurate deep neural network inference using computational phase-change memory. Nature Communications | (2020) 11:2473 | https://doi.org/10.1038/s41467-020-16108-9 | www.nature.com/naturecommunications. (Year: 2020).*
International Patent Application No. PCT/CA2021/051357, entitled Mixed-Mode Crossbar Array and Associated Method, filed on Sep. 29, 2021.

* cited by examiner

*Primary Examiner* — Collin X Beatty

(57) ABSTRACT

An apparatus and method for computing multiplication operations involving vectors, matrices or both, using a photonic computing architecture including an optical crossbar array. A compensation device is used to compensate for non-ideal characteristics of devices in the optical crossbar array. Apparatus and methods for representing negative-valued vectors of a multiplier in the multiplication operation are also provided.

20 Claims, 13 Drawing Sheets

102 104 106

$$\begin{bmatrix} x_1 \\ x_2 \\ \vdots \\ x_m \end{bmatrix}^T \begin{bmatrix} c_{11} & c_{12} & \cdots & c_{1n} \\ c_{21} & c_{22} & \cdots & c_{2n} \\ \vdots & \vdots & & \vdots \\ c_{m1} & c_{m2} & \cdots & c_{mn} \end{bmatrix} = \begin{bmatrix} y_1 \\ y_2 \\ \vdots \\ y_n \end{bmatrix}^T$$

FIG. 1

902

904

$$x = [-|x_1| \quad |x_2| \quad -|x_3|]$$

$$C = \begin{bmatrix} c_{11} & c_{12} & c_{13} \\ c_{21} & c_{22} & c_{23} \\ c_{31} & c_{32} & c_{33} \end{bmatrix}$$

906

922

924

$$|x| = [|x_1| \quad |x_2| \quad |x_3|]$$

$$\hat{C} = \begin{bmatrix} -c_{11} & -c_{12} & -c_{13} \\ c_{21} & c_{22} & c_{23} \\ -c_{31} & -c_{32} & -c_{33} \end{bmatrix}$$

926

FIG. 9

OPTICAL CROSSBAR ARRAY WITH COMPENSATION AND ASSOCIATED METHOD

CROSS-REFERENCE TO RELATED APPLICATIONS

This is the first application filed for this invention.

FIELD OF THE INVENTION

This disclosure pertains generally to the field of photonic computing and in particular to an optical crossbar array architecture usable for implementing vector or matrix multiplication operations.

BACKGROUND OF THE INVENTION

In a variety of applications, such as but not necessarily limited to machine learning and signal processing for communications, it is required to perform a significant amount of vector-to-vector, vector-to-matrix, matrix-to-vector, or matrix-to-matrix multiplication. Such multiplications are referred to herein as matrix-vector multiplications (MVMs). Moreover, it is required to perform such multiplications in a timely and energy-efficient manner. One device for performing such multiplications is known as an optical crossbar array.

In the optical crossbar array, optical signals representing elements of an input vector (which may be a row or column of a matrix) are generated and provided to a set of horizontal, vertically separated (at least diagrammatically) input waveguides. A set of vertical, horizontally separated (again, at least diagrammatically) output waveguides is also provided, with each input waveguide sequentially crossing each output waveguide. The crossings of the input waveguides and output waveguides are thus arranged in the form of a rectangular array, and a set of devices are located at these crossings. Each such device can be controlled to represent an element in a matrix, and configured to output a signal which represents a (scalar) multiplication between an element of the input vector and an element of the matrix. Each output waveguide accumulates (sums) multiple such outputs of multiplications, to generate an output which represents a (vector) multiplication between the input vector and one row or column of the matrix. Thus a multiplication between a vector and a matrix can be performed with the result being read from the output waveguides. By performing a sequence of such multiplications, with the same matrix but different vectors representing different rows or columns of another matrix, a multiplication between two matrices can similarly be performed. An electrical crossbar array can be similarly provided, with electrical signals being used and manipulated, rather than optical signals.

Phase change materials (PCMs) are materials that can be set to a configurable, persistent state, being a fully (or maximally) crystalline state, a fully (or maximally) amorphous state, or an intermediate (partially crystalline, partially amorphous) state. Different states can exhibit different optical properties, different electrical properties, or both. For example, a PCM cell can pass a fraction of received input light to an output, such a fraction being dependent on the PCM cell's state. Thus, the devices at the crossings of a crossbar array can each include a respective PCM cell, which is programmed according to an element in the matrix involved in a multiplication. The input signals can similarly be set to have intensities which represent (e.g. are in proportion to) elements of an input vector. PCMs with varying electrical (e.g. resistive) properties are similarly available and usable in electrical crossbar arrays.

However, implementing such crossbar arrays comes with a variety of challenges. For example, negative vector or matrix values are not straightforward to represent via optical signal intensities, since a "negative" intensity of light is not directly representable. As another example, undesired and unavoidable leakages or losses of light (or electrical current) in a crossbar array can occur due for example to imperfections or inherent limitations in components. Understanding and compensating for such imperfections is required to produce a properly operating crossbar array for performing MVMs or other tasks.

Therefore, there is a need for an optically implemented matrix-vector multiplication method and apparatus that obviates or mitigates one or more limitations in the prior art.

This background information is intended to provide information that may be of possible relevance to the present invention. No admission is necessarily intended, nor should be construed, that any of the preceding information constitutes prior art against the present invention.

SUMMARY OF THE INVENTION

Embodiments of the present disclosure generally provide for a method and apparatus for performing MVMs such as vector-to-vector, matrix-to-vector (or vector-to-matrix), or matrix-to-matrix multiplications. A crossbar array is used to perform a multiplication between an input vector (which may in some cases be a row or column of a matrix) and an input matrix (which may in some cases be a vector, i.e. a matrix with one row or column). In some embodiments, a set of components is provided which interacts with input signals, indicative of the input vector, to generate a compensation output. The compensation output can be used to compensate for errors in the MVM, such errors being due to limitations in attenuative components, such as PCMs, which implement parts of the MVM by attenuating signals having intensities that represent elements of the input vector.

Embodiments of the present disclosure provide for a method and apparatus for representing negative entries in an input vector presented to a crossbar array, for multiplying with an input matrix. The crossbar array may or may not also include the above-mentioned set of components generating a compensation output.

According to embodiments, there is provided an apparatus having an optical crossbar array, a compensation device, and a readout device. The optical crossbar array includes a set of input waveguides, a set of output waveguides, and a set of processing elements. Each of the input waveguides is configured to propagate a different respective one of a set of input optical signals. Each one of the input optical signals has an intensity representative of a corresponding element of an input vector. Each one of the output waveguides is configured to provide a different respective one of a set of output optical signals. Each processing element is configured to receive a portion of one of the set of input optical signals and pass a respective controllable fraction of that portion to one of the set of output waveguides. The controllable fractions are based on values of elements of an input matrix to be multiplied with the input vector. Each one of the output optical signals includes multiple ones of the controllable fractions. The compensation device is configured to receive further portions of each one of the input optical signals from the set of input waveguides, and generate a compensation output optical signal having an intensity proportional to a sum of intensities of these further portions. The readout device is configured to: receive the set of output optical signals; receive the compensation output optical signal; and provide a compensated result of a multiplication between the input vector and the input matrix. The compensated result is generated based at least in part on the set of output optical signals and the compensation output optical signal.

In some embodiments, the compensation device includes a plurality of further processing elements. Each further processing element is configured to receive a different one of the further portions and pass a fixed part or all of said different one of the further portions to a further output waveguide. This is performed in order to generate the compensation output optical signal within the further output waveguide. In various embodiments, each of the processing elements and each of the further processing elements has an identical structure, within manufacturing tolerances. In various embodiments, each of the processing elements and the further processing elements includes a phase change material (PCM).

In some embodiments, providing the compensated result of the multiplication between the input vector and the input matrix includes generating an indication of a raw output vector based on the set of output optical signals; generating an indication of a compensation value based on the compensation output optical signal; and generating the compensated result to represent a scaled result of a difference between: the raw output vector; and the compensation value or the compensation value multiplied by a predetermined scalar value. In some further embodiments, the scaled result corresponds to said difference multiplied by another predetermined scalar value, and the predetermined scalar value, the other predetermined scalar value, or both, are determined using a calibration operation performed on the apparatus.

In some embodiments, the apparatus is further configured to generate, using the optical crossbar array or another optical crossbar array having a same configuration as the optical crossbar array, a second set of output optical signals indicative of a result of multiplying the input vector with a second input matrix. In such embodiments, the apparatus is further configured to provide a second compensated result of a multiplication between the input vector and the second input matrix. The second compensated result is generated based at least in part on the second set of output optical signals and the compensation output optical signal. In some further embodiments, the compensation output optical signal, or an indication thereof, is stored in and subsequently retrieved from a memory to support generating the compensated result, generating the second compensated result, or both. In some embodiments, the input matrix and the second input matrix are different partitions of an overall matrix.

In some embodiments, the input vector is a row or column of a further input matrix, and the apparatus is configured to perform a matrix-to-matrix multiplication by multiplying each of two or more rows or columns of the further input matrix with the input matrix.

According to embodiments, there is provided a method comprising operating an optical crossbar array, operating a compensation device, and operating a readout device. The optical crossbar array is as already described above. Operating the compensation device includes: receiving further portions of each one of the set of input optical signals from the set of input waveguides; and generating a compensation output optical signal having an intensity proportional to a sum of intensities of said further portions. Operating the readout device includes: receiving the set of output optical signals; receiving the compensation output optical signal; and providing a compensated result of a multiplication between the input vector and the input matrix. The compensated result is generated based at least in part on the set of output optical signals and the compensation output optical signal. Other aspects of the method may be provided, corresponding to aspects of the of the apparatus as already described above.

According to embodiments, there is provided an apparatus comprising: one or a pair of optical crossbar arrays each respectively comprising: a set of input waveguides each configured to propagate a different respective one of a set of input optical signals, each one of the set of input optical signals having an intensity representative of a corresponding element of an input vector; a set of output waveguides each configured to provide a different respective one of a set of output optical signals; and a set of processing elements each configured to receive a portion of one of the set of input optical signals and to pass a respective controllable fraction of said portion to one of the set of output waveguides. The controllable fractions are based on values of an input matrix to be multiplied with the input vector, each one of the set of output optical signals comprising multiple ones of the controllable fractions. The apparatus further includes an input splitting device configured to: decompose a first vector into a first partial vector and a second partial vector, wherein each element of the first partial vector and each element of the second partial vector is positive, and wherein the first vector is equal to a difference between the first partial vector and the second partial vector; provide the first partial vector as the input vector to the optical crossbar array at a first time to obtain the set of output optical signals therefrom as indicative of a first result of multiplying the first partial vector with the input matrix, or provide the first partial vector as the input vector to a first one of the pair of optical crossbar arrays to obtain the set of output optical signals therefrom as indicative of the first result; provide the second partial vector as the input vector to the optical crossbar array at a second time to obtain the set of output optical signals therefrom as indicative of a second result of multiplying the second partial vector with the input matrix, or provide the second partial vector as the input vector to a second one of the pair of optical crossbar arrays to obtain the set of output optical signals therefrom as indicative of the second result. The apparatus further includes a readout device configured to: receive the optical signals indicative of the first result and the optical signals indicative of the second result; and provide a result of a multiplication between the input vector and the input matrix, the result being generated based at least in part on the optical signals indicative of the first result and the optical signals indicative of the second result, the result being indicative of a difference between the first result and the second result. An associated method may also be provided.

In some embodiments, decomposing the first vector into the first partial vector and the second partial vector comprises: producing each $i^{th}$ element of the first partial vector as being: equal to a corresponding $i^{th}$ element of the first vector when said corresponding $i^{th}$ element of the first vector is greater than zero; and equal to zero when said corresponding $i^{th}$ element of the first vector is less than or equal to zero; and producing each $i^{th}$ element of the second partial vector as being: equal to the corresponding $i^{th}$ element of the first vector when said corresponding $i^{th}$ element of the first vector is less than zero; and equal to zero when said corresponding $i^{th}$ element of the first vector is greater than or equal to zero.

In some embodiments, the above apparatus includes (and the associated method involves operating) a compensation device configured to receive further portions of each one of the set of input optical signals from the set of input waveguides of the optical crossbar array or one or both of the pair of optical crossbar arrays, and generate a compensation output optical signal having an intensity proportional to a sum of intensities of said further portions. The readout device is further configured to provide the result of the multiplication based in part on the compensation output optical signal.

Embodiments have been described above in conjunctions with aspects of the present disclosure upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

FIG. 1 illustrates an expression of a vector to matrix multiplication according to an embodiment of the present disclosure.

FIG. 9 illustrates expressions in relation to an approach for handling negative elements of a multiplier vector, according to an embodiment of the present disclosure.

It will be noted that throughout the appended drawings, like features are identified by like reference numerals.

DETAILED DESCRIPTION OF THE INVENTION

Embodiments of the present disclosure generally provide for a method and apparatus for performing vector-to-vector, matrix-to-vector, or matrix-to-matrix multiplications (collectively referred to as matrix-vector multiplications or MVMs) using a (e.g. photonic) computing apparatus, which may in various embodiment perform in-memory computing. Embodiments can be applied in a variety of applications such as, but not necessarily limited to, artificial intelligence (AI) implementations, machine learning (ML) or deep learning (DL) neural networks, wireless communications, autonomous driving, LIDAR, robotics, and other applications that require matrix or vector multiplication operations. When used for wireless communications applications, embodiments may be used either at the user side or at the base station side and implement features such as detection, estimation, distortion cancellation, and beamforming.

FIG. 1 illustrates a MVM involving a vector x 102 as a multiplier, a matrix C 104 as a multiplicand, and a result vector y 106. Such an MVM is well known in linear algebra. The vectors are shown in transposed form. Potentially, the vector x may be a row (or column) of a matrix X. By performing MVMs using multiple vectors x representing different rows or columns of the matrix X and aggregating the results, a matrix-to-matrix multiplication XC can be performed. In this case, each constituent MVM multiplies one vector x (a row or column of X) with the matrix C.

Values for m and n, e.g. the number of rows and columns of the matrix C, are greater than or equal to one. The vector x, matrix C, or both, can be portions of larger vectors or matrices, and obtained via partitioning. This allows large MVM operations to be decomposed into multiple smaller MVM operations, according to the principle of matrix partitioning and block matrix multiplication. Such a decomposition and associated multiple MVM operations, can be performed in association with the method and apparatus as described herein. For example, multiple optical crossbar arrays can be used to implement different ones of the multiple MVM operations, the same optical crossbar array can be used to implement different ones of the multiple MVM operations at different times or at the same time using frequency/wavelength division multiplexing techniques, or the like, or a combination thereof. The results of the block multiplications can then be aggregated together to obtain a final result. This allows large vectors and matrices to be multiplied using optical crossbar arrays of limited size (limited processing elements).

Figure 2:
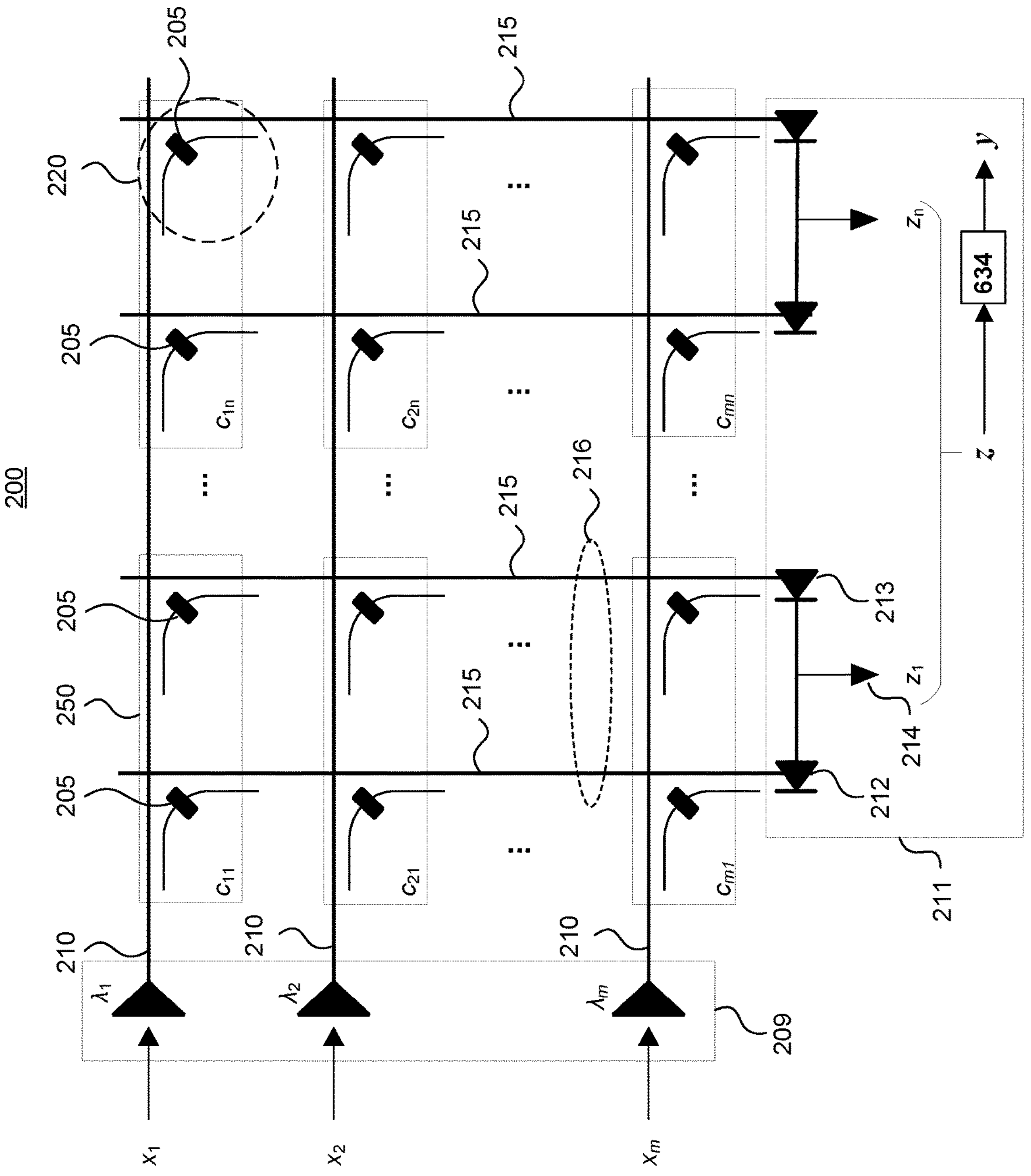
FIG. 2 illustrates an optical crossbar array apparatus capable of handling both positive and negative matrix elements, according to an embodiment of the present disclosure.

FIG. 2 illustrates an optical crossbar array 200 for performing the MVM of FIG. 1, in association with embodiments of the present disclosure. Elements (also referred to as entries) $x_1, x_2, \ldots x_m$ of the input vector x are encoded as input optical signals by an input stage 209 and the input optical signals are provided to a set of input waveguides 210. The input stage 209 can include, for example, lasers or photodiodes which output light of a controllable intensity. Each input optical signal has an intensity which represents (e.g. is proportional to a value of) a corresponding element $x_i$ of the input vector (i.e. the multiplier) x. Each input waveguide 210 propagates a different respective one of the input optical signals. As illustrated, each one of the input optical signals may have a different wavelength A. The use of different wavelengths can inhibit complications due to signal leakages, for example. However, it is noted that the photodetectors 212, 213, are configured to detect light across a band of wavelengths which includes all of the different wavelengths $\lambda_1, \lambda_2, \ldots \lambda_m$.

The optical crossbar array 200 further includes a set of processing element pairs 250, the pairs forming (as illustrated) an m-row by n-column rectangular array. Each processing element pair 250 includes two processing elements 220, and each of the two processing elements includes an attenuation device 205, such as a PCM cell.

In operation, a processing element 220 receives a portion of an input optical signal, from an input waveguide 210 to which it is coupled, and passes a controllable fraction of this received portion to an output waveguide 215 to which it is also coupled. To facilitate such coupling, the processing element may include an input coupler and an output coupler (shown as line segments parallel to the input and output waveguides, respectively), each of which may be a directional coupler, a contra-directional coupler, or the like. Between the input coupler, which couples the portion of the input optical signal onto the processing element, and the output coupler, which couples the controllable fraction of this received portion onto the output waveguide, is the attenuation device 205, which receives light from the input coupler, and implements the controllable fraction by passing a controllable portion of this received light to the output coupler. This may involve blocking or filtering out some of the light at the attenuation device. Thus, by controlling (e.g. by electrical or optical programming) the attenuation device 205, the controllable fraction of light can be passed from the input waveguide to the output waveguide. Such controllable fractions are used to represent elements of the multiplicand (input) matrix C.

The illustrated intersections between input waveguides and output waveguides are not necessarily locations at which light couples from input waveguide to output waveguide or vice-versa, and indeed it is desirable for light not to couple from input waveguides to output waveguides except via the processing elements.

In the embodiment of FIG. 2, each processing element pair 250 includes two processing elements 220 which operate together to represent a single element $c_{ij}$ of the input matrix C. These two processing elements 220 of the same pair 250 are both coupled to a same input waveguide, but each is coupled to a different output waveguide. These two output waveguides also operate in pairs 216 to receive outputs from different processing elements of multiple processing element pairs, each processing element pair representing a matrix element in a same column of the input matrix. The two processing elements in a processing element pair representing $c_{ij}$ are controlled so that a first (e.g. leftmost) processing element of the pair passes a first controllable fraction $f_1(ij)$ of light provided thereto, a second (e.g. rightmost) processing element of the pair passes a second controllable fraction $f_2(ij)$ of light provided thereto, and ideally $c_{ij}=f_1(ij)-f_2(ij)$. In some embodiments, one of $f_1(ij)$ and $f_2(ij)$ can be always set to zero. Thus, the controllable fractions are based on values of elements of the input matrix C. The controllable fractions $f_1(ij)$ and $f_2(ij)$ are between zero and one, and ideally would span the entire range between zero and one. However, due to limitations as will be described below, the fractions cannot be expected to span this entire range. To address this issue, a compensation is implemented, as described elsewhere herein. In various embodiments, for each i and j, one of $f_1(ij)$ and $f_2(ij)$ can be set equal to zero.

Here, it is assumed that the matrix C is normalized so that the absolute value of all elements is less than or equal to one. This may be achieved for example by dividing the matrix C by a scalar value which is equal to or greater than the element of C having maximum absolute value among all elements of C. This normalization allows the attenuation devices to directly represent the elements of the matrix. A non-normalized version of the matrix C can be recovered via scalar multiplication, if necessary.

The two output waveguides of a same pair 216 provide output optical signals which are coupled to two inputs of a balanced photodetector (BPD) having a first photodetector 212 and a second photodetector 213, each of which may be a photodiode, for example. It is also noted that the output waveguides are coupled to multiple processing element pairs, to accumulate output light from each of these multiple pairs. Thus, each output optical signal includes multiple controllable fractions of light, from multiple processing elements, and the intensity of an output optical signal is consequently a sum of intensities of these multiple controllable fractions of light. The output $z_i$ 214 of the BPD is indicative of the difference between the intensities of the two output optical signals received thereby. The BPD may be part of a readout device 211, which receives the output optical signals.

In operation, therefore, the optical crossbar array 200 receives, via its input waveguides, a set of m input optical signals having intensities proportional to elements $x_i$ of input vector x. The $i^{th}$ input optical signal, representing element $x_i$ and propagating on the $i^{th}$ input waveguide, is split so that portions are fed into each of 2n processing elements forming n processing element pairs. The $j^{th}$ processing element pair coupled to the $i^{th}$ input waveguide passes, onto the $j^{th}$ pair of output waveguides, controllable fractions of light having intensities proportional to $x_i f_1(ij)$ and $x_i f_2(ij)$, respectively. The $j^{th}$ pair of output waveguides, accumulating outputs from multiple processing element pairs, produces an output optical signal having intensities, respectively, of:

$$\sum_{i=1}^{m} x_i f_1(ij), \sum_{i=1}^{m} x_i f_2(ij). \tag{1}$$

In an ideal device, in which $c_{ij}=f_1(ij)-f_2(ij)$, the $j^{th}$ BPD then outputs a signal $z_i$ proportional to:

$$\sum_{i=1}^{m} x_i c_{ij}. \tag{2}$$

In this manner, the set of n BPDs output signals form a vector $z$ which is ideally equal to (or at least in known proportion to) the multiplication result xC. That is, the vector $z$ in this ideal case is equal to the desired result y, and no further processing is necessary. The proportions are known and can be compensated for, thus allowing the multiplication to be implemented, at least in the ideal situation.

Figure 3:
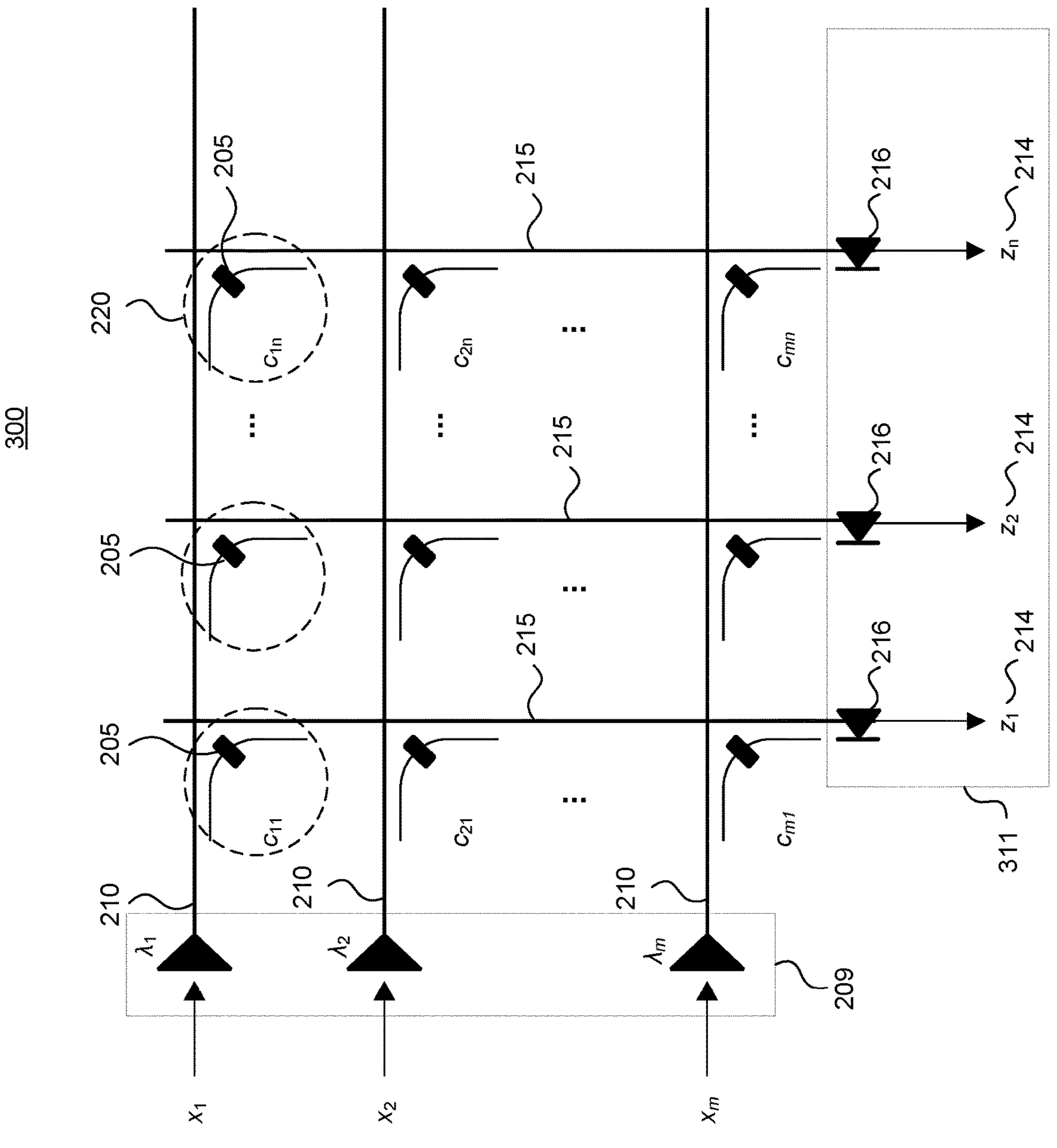
FIG. 3 illustrates an optical crossbar array apparatus capable of handling positive-only or negative-only matrix elements, according to another embodiment of the present disclosure.

FIG. 3 illustrates an optical crossbar array 300 for performing the MVM of FIG. 1, in association with other embodiments of the present disclosure. Whereas the array 200 of FIG. 2 is capable of representing both positive and negative elements by use of processing element pairs, the array 300 of FIG. 3 is only capable of representing a matrix having only positive elements (or only negative elements, if the negative sign is treated separately). The optical crossbar array 300 operates similarly to the array 200 of FIG. 2 (some details being not repeated for the sake of clarity) except that processing element pairs are replaced with single processing elements. In operation, a single processing element 220 receives a portion of an input optical signal from an input waveguide 210 to which it is coupled, and passes a controllable fraction of this received portion to an output waveguide 215 to which it is also coupled. As before, an attenuation device 205 is controlled to adjust the controllable fraction passed from the input waveguide to the output waveguide. The processing element representing $c_{ij}$, the $ij^{th}$ element of matrix C, ideally passes controllable fraction $c_{ij}$ of the light provided thereto. The output waveguides, which include multiple controllable fractions of light from multiple processing elements, are coupled to a photodetector 216 such as a photodiode. The photodetector provides an output $z_i$ 214 indicative of the total intensity of light of said multiple controllable fractions of light.

In operation, therefore, the optical crossbar array 300 receives, via its input waveguides, a set of m input optical signals having intensities proportional to elements $x_i$ of input vector x. The $i^{th}$ input optical signal, representing element $x_i$ and propagating on the $i^{th}$ input waveguide, is split so that portions are fed into each of n processing elements. The $j^{th}$ processing element coupled to the $i^{th}$ input waveguide passes, onto the $j^{th}$ output waveguide, a controllable fraction of light having intensities proportional to the product $x_i c_{ij}$. The $j^{th}$ output waveguide, accumulating outputs from multiple processing element pairs, thus directly produces an output optical signal having intensities proportional to the Equation (2), and the photodetectors 216 also output signals representative of these quantities. In this manner, the set of n photodetector output signals form a vector $z$ which is ideally proportional to the multiplication result xC. The photodetectors are part of a readout device 311. That is, the vector z in this ideal case is equal to the desired result y, and no further processing is necessary. The proportions are known and can be compensated for, thus allowing the multiplication to be implemented, at least in the ideal situation.

It is noted that the optical crossbar array 300 can be operated similarly to the optical crossbar array 200 by operating processing elements in pairs, and by subtracting (e.g. using digital processing, analog processing, or both in the readout device) outputs from associated pairs of photodetectors.

In FIGS. 2 and 3, each processing element receives a fixed portion of an input optical signal, based on the configuration of its input coupler and the amount of optical signal remaining at a corresponding location of the input waveguide. An input optical signal can be appropriately (e.g. evenly) distributed amongst processing elements coupled to a same input waveguide by input coupler configuration. The processing element's output coupler might pass approximately all of its received light to the output waveguide, although some losses are expected. In various embodiments, the attenuation device is controllable to pass between a minimum portion $a \geq 0$ of the light provided thereto and a maximum portion $a+b \leq 1$ of the light provided thereto. In practice, a is typically strictly greater than zero and a+b is typically strictly less than one. For purposes of clarity and simplicity, the "controllable fraction" of the input signal as output by a processing element is equated herein with the portion of light passed by the attenuation device, multiplied by the intensity of input optical signal propagating in the input optical waveguide to which the processing element is coupled. This limitation on the attenuation device leads to a non-ideal situation which is described below, with particular focus on PCM devices by way of example.

In various embodiments, the controllable fraction of a portion of an input optical signal, as passed to the output waveguide, refers to a fraction which is less than or equal to one, relative to the maximum amount of input optical signal that might be passed to the output optical waveguide, given the configurations and limitations of the input coupler, output coupler, and under the assumption (for the sake of the present calculation) that a+b=1. Thus, for example, assume that an attenuation device is linear such that, when provided with a control input indicating a value $c_{ij}$ for a matrix element (between zero and one), the attenuation device passes a controllable fraction proportional to $ac_{ij}+b$ of the input signal $x_i$ onto the output waveguide. (Because input signal $x_i$ is shared between several processing elements, there will be a further fixed fractioning, which is not considered here, but which is addressed by the "proportional to" language.) Thus, the contribution to the associated output optical signal is proportional to $x_i(ac_{ij}+b)$. Alternative formulations are also possible.

Figure 4:
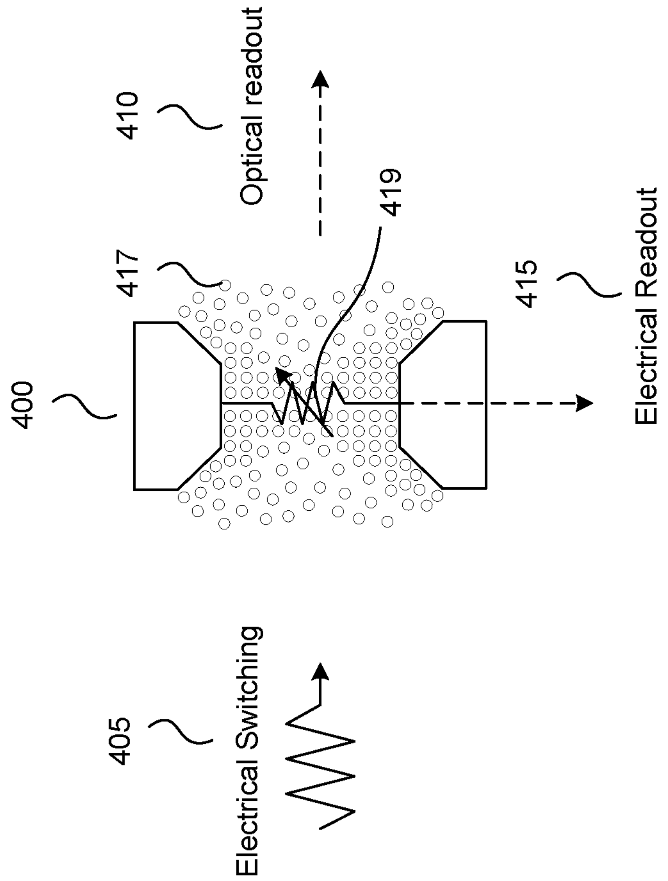
FIG. 4 illustrates an optically readable phase change material (PCM) device, according to an embodiment of the present disclosure.

FIG. 4 illustrates a PCM device 400, which may be used as an attenuation device, according to embodiments of the present disclosure. The PCM device is responsive to an electrical switching input signal 405 used to program its state. An optical readout operation 410 can be performed to read the state of the PCM device by determining the corresponding optical property (e.g. proportion of optical signal passed vs. absorbed), and an electrical readout operation 415 can, in some embodiments, be performed to read the state of the mixed-mode memory element by determining the corresponding electrical property (e.g. resistance). The PCM device can be implemented using a plasmonics approach with a PCM in a nanogap. The PCM is illustrated as particles 417. The state of the PCM causes variability in a resistance 419 and also variability in optical properties. The PCM device can be programmed using electrical pulses having length and/or intensity set to induce a desired new state of the PCM.

In a crystalline state of the PCM device, most of the light provided thereto is absorbed. In an amorphous state of the PCM device, most of the light provided thereto is passed. By configuring the PCM device to be in the crystalline or amorphous state, or in an intermediate (partially crystalline/amorphous) state, the PCM device can be operated as a controllable attenuator with multiple (at least two) states. The state of the PCM device may be persistent, so that it need not be actively maintained e.g. via electrical current.

Figure 5:
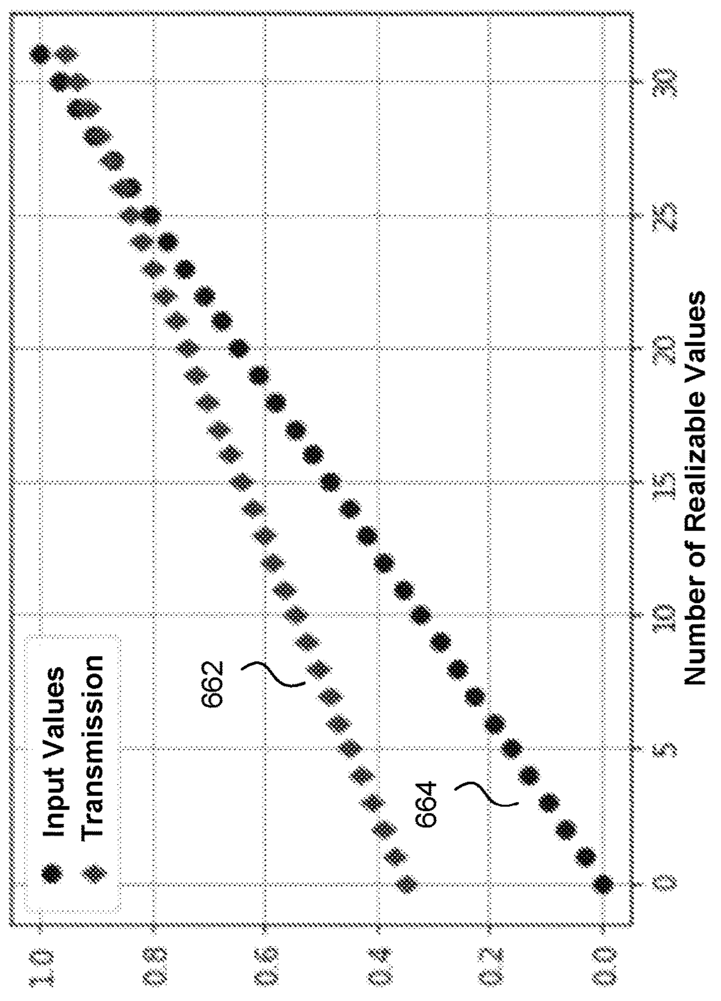
FIG. 5 illustrates a non-ideal behaviour of a PCM device, according to an embodiment of the present disclosure.

FIG. 5 illustrates the optical behavior 560 of a PCM device 400 according to an example embodiment of the present disclosure. The PCM device is operable in a number (in this case 32) of different states, by programming the phase-change material thereof to be in a maximally crystalline state, maximally amorphous state, or in an intermediate state between these two extremes. The number of different states may relate to the precision to which the PCM device is programmed. The set of input values 664 illustrates the values, between 0 and 1, which can be provided as the normalized input values to program the PCM device. An input value $v_{ij}$ can be a discretized version of a matrix element $c_{ij}$, or a value (e.g. $f_1(ij)$ or $f_2(ij)$) based thereon. The set of values transmission 662 illustrates the corresponding optical transmission values exhibited by the PCM device in response to being programmed with such an input value. As shown, the optical transmission values (for the considered wavelength) range from a minimum of about 0.35 to a maximum of about 0.95, and follow a substantially linear arrangement. The optical transmission values are the values achievable as the controllable fractions of input optical signal passed by an attenuation device (in this case a PCM device) as discussed above. In other words, in each wavelength, the PCM device causes an associated processing element to pass a controllable fraction, proportional to fraction $av_{ij}+b$, of the input optical signal (intensity $x_i$) onto an associated output waveguide, where in this example a=0.6 and b=0.35.

Next, consider the impact of this non-ideality on the optical crossbar array 200 of FIG. 2. In this case, $v_{ij}$ is assumed equal to $f_1(ij)$ or $f_2(ij)$ for each processing element. The values of a and b are assumed to be substantially the same for all PCM devices, for example as a result of co-fabrication within good manufacturing tolerances. In this case, instead of Equation (1), the $j^{th}$ pair of output waveguides, accumulating outputs from multiple processing element pairs, produces an output optical signal having intensities, respectively, of:

$$\sum_{i=1}^{m} x_i(af_1(ij)+b),\ \sum_{i=1}^{m} x_i(af_2(ij)+b). \tag{1a}$$

Noting cancellation of the terms involving b when subtracting the two quantities in Equation (1a), the $j^{th}$ BPD then outputs a signal $z_i$ proportional to:

$$a\sum_{i=1}^{m} x_i c_{ij}. \tag{2a}$$

In this manner, the set of n BPDs output signals form a vector $\underset{\sim}{z}$ which is ideally proportional to the multiplication result axC. The value of a can be determined via calibration operations, for example performing, using the optical crossbar array 200, test multiplications using vectors and matrices having known results, and comparing the known results to the output of the optical crossbar array 200 in order to discover scaling errors, which indicate the value a. The vector y, i.e. the actual (compensated) result of a multiplication, can then be recovered from the obtained vector $\underset{\sim}{z}$ by dividing the vector $\underset{\sim}{z}$, as obtained from the BPDs, by this determined value a. Other known proportionality constants can also be compensated for, e.g. by similar calibration operations.

As noted above, it may be assumed that the values of a and b are assumed to be substantially the same for all PCM (or other attenuation) devices. In practice, different instances of PCM (or other attenuation) devices may have different characteristics, and thus potentially different a and b values. However, in such cases, embodiments of the present disclosure can incorporate further measures to cause the PCM or other attenuation devices to function as is they have the same characteristics, and thus the same or similar a and b values.

For example, each PCM device of an optical crossbar array can be calibrated so that it passes a same proportion of optical signal in response to a same control input. The control input can be set so that the appropriate crystallization ratio of the PCM device, resulting in this proportion of optical signal, is set in the PCM device. The calibration can be performed for each PCM device in view of the wavelengths of light which the PCM device operates on, noting that different wavelengths of light are effected differently even by a same PCM device. The a and b values can then be the common, effective a and b values for a collection of PCM devices (of the same optical crossbar array) after such a calibration. As part of the calibration, the effective a and b values may be set to reflect a range of optical attenuation which is achievable by each PCM device, given the wavelengths of optical input signal presented thereto. Thus, due for example to such calibration, it is considered feasible that all PCM devices can be characterized by the same a and b values, i.e. by the same (linear) transmission curve 662 of FIG. 5.

Furthermore, the effective a and b values can be one can consider the smallest transmission range amongst the wavelengths used in the optical crossbar array, and accordingly force the mapping from input control values to amounts of optical transmission to be the same for all the wavelengths.

Next, consider the impact of the non-ideality on the optical crossbar array 300 of FIG. 3. In this case, $v_{ij}$ is assumed equal to $c_{ij}$ for each processing element. The values of a and b are again assumed to be substantially the same for all PCM devices. In this case, instead of Equation (1), the output waveguide, accumulating outputs from multiple processing element pairs, produces an output optical signal having intensity:

$$\sum_{i=1}^{m} x_i(ac_{i,j}+b). \tag{1b}$$

The $j^{th}$ photodetector (PD) then outputs a signal $z_i$ proportional to the value of Equation (1b), which can alternatively be represented as:

$$a\sum_{i=1}^{m} x_i c_{ij} + b\sum_{i=1}^{m} x_i. \tag{2a}$$

In this case, in order to recover the required result (as expressed in Equation (2)), one needs not only to determine the value of a, but also the value of the right-hand term in Equation (2b), which is dependent on the input vector x. Embodiments of the present disclosure address this need by use of a compensation device. The compensation device optically determines the right-hand term, or a related quantity. The compensation device can perform this by receiving portions of the input optical signals, for example via the input waveguides of the optical crossbar array 300). Such portions can be further to the portions used in the crossbar array multiplication operations. The compensation device then generates a compensation output optical signal having an intensity proportional to a sum of intensities of these portions of the optical signal, and thus proportional to the right-hand term in Equation (2b). This compensation output optical signal can then be used, by the optical crossbar array's readout device, to generate a compensated result of the multiplication, that is to provide the desired output y using the actual provided output $\underset{\sim}{z}$.

It is noted that the imperfections (e.g. of the attenuation devices) being compensated for are also present in the compensation device itself. However, embodiments of the present disclosure nonetheless can perform the appropriate compensation. For example, by setting all of the attenuation devices (PCM devices) within the compensation device to pass a minimal amount (nominally zero) of light, the attenuation devices, due to their imperfection, actually pass a proportion b of light, thus the output of each attenuation device is $bx_i$. Summing these outputs gives the right-hand term of Equation (2b) directly (see e.g. Equation (3) below and the associated discussion). This is the required term to be subtracted from the crossbar array output in order to appropriately perform the compensation.

Figure 6:
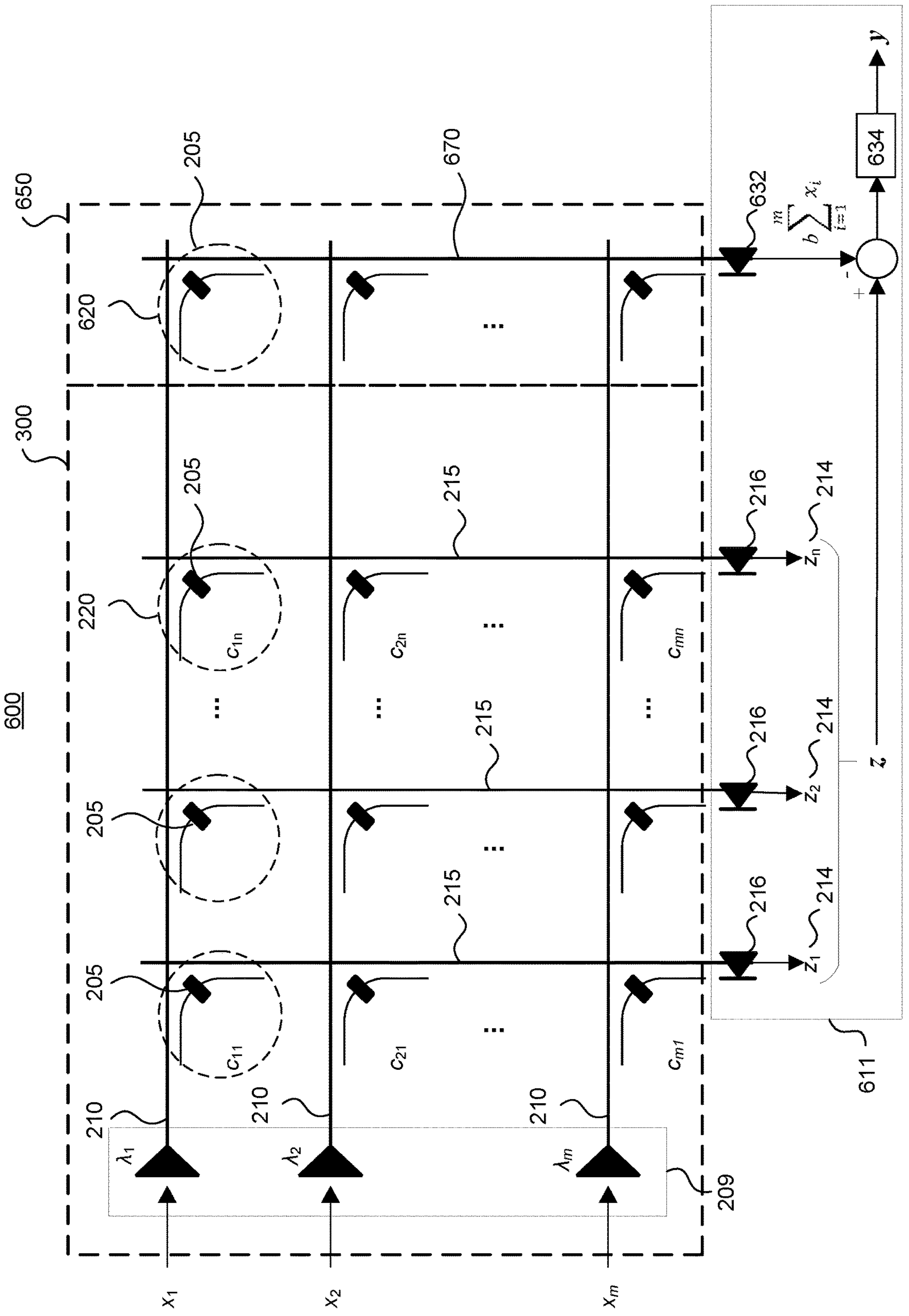
FIG. 6 illustrates the crossbar array apparatus of FIG. 3, with the addition of a compensation device and readout circuit configuration for compensating for non-ideal behaviours of a PCM device or other attenuation device in the crossbar array, according to an embodiment of the present disclosure.

FIG. 6 illustrates an apparatus 600 including such a compensation device 650 along with the optical crossbar array 300, according to an embodiment of the present disclosure. The compensation device includes a plurality of processing elements 620, similar to the processing elements 220 of the crossbar arrays 200 and 300, as already described above. In fact, in various embodiments, it is desired that the processing elements 220 and 620 (or at least the attenuation devices thereof) all have an identical structure, at least within manufacturing tolerances. Further, in various embodiments, to facilitate this, it is desired that the processing elements 220 and 620 are all co-fabricated. In this manner, the processing elements will have similar response characteristics and can be characterized by the same or similar a and b parameters as used in Equations (1a), (1b), (2a) and (2b). Each processing element 620 includes an input coupler, output coupler and attenuation device 205.

The attenuation devices 205 of the further processing elements 620 may be controllable or non-controllable. Non-controllable attenuation devices may be set to attenuation optical signals provided thereto by a predetermined fixed amount. The attenuation devices of the processing elements and the further processing elements may be PCM devices.

In various embodiments, the number of processing elements 620 is at least equal to the number of input waveguides of the optical crossbar array 300. Each of the processing elements 620 is operatively coupled to a different one of these input waveguides, to receive a different respective further portion of an input optical signal therefrom. The processing elements 220 of the crossbar array and the processing elements 620 may be co-configured so that appropriate portions of input optical signal are obtained thereby. For example, to accommodate the requirements of the additional processing elements 620, each processing elements 220 may be configured to couple a lesser portion of input optical signal from its input waveguide, compared to the case where the compensation device 650 is absent. The further processing elements The compensation device 650 further includes a further output waveguide 670, which is operatively coupled to the processing elements 620 in order to receive output therefrom, similarly to the output waveguides 215. The output waveguide 670 accumulates these outputs to generate a compensation output optical signal propagating within the further output waveguide 670. Although the optical crossbar array 300 is illustrated as being between the inputs to the input waveguides and the processing elements 620 of the compensation device, this is only one possibility. In other embodiments, the processing elements 620 can be between the inputs to the input waveguides and the optical crossbar array 300, or the processing elements 620 can be placed within the optical crossbar array 300 so that they are between some processing elements 220 of the crossbar array and other processing elements 220 of the crossbar array. The readout device 311 of the array 300 can be extended here to provide a readout device 611. The readout device 611 includes a further photodetector 632 which receives the compensation output optical signal from the further output waveguide 670 and produces an electrical representation of the compensation output optical signal. Then, the readout device 611 is configured to provide a compensated result of a multiplication of the input vector and the input matrix based on the compensation output optical signal (using its electrical representation) and the set of output optical signals as provided by the photodetectors 216. The compensated result can be produced using subtraction (e.g. subtracting a scalar from each element of a vector), in order to produce a result of the multiplication in which the non-ideal effects as characterized by parameters a and b and expressed in Equation (2b) are mitigated or removed.

The compensation (e.g. involving subtracting a scalar value from each element of a vector) can be performed in the electrical domain, for example by signal processing or by using balanced photodetectors, or other configuration of the photodetectors (e.g. adjusting response characteristics thereof). Alternatively, the compensation can be performed in the optical domain, in which case the photodetectors may be moved to an output of photonic devices performing such compensation operations, or the photodetectors may participate in such compensation operations. If present, photonic devices implementing compensation operations (e.g. subtraction) may directly receive outputs of the output waveguides and the further output waveguide.

In some embodiments, if required, the readout device 611 may include at least one multiplier 634, which may be an analog or digital multiplier. The multiplier 634 may be controllable. The multiplier may multiply output of the photodetectors 216, output of the further photodetector 632, or both. The multiplication can be performed before or after a subtraction operation is performed involving output of the photodetectors 216 and output of the further photodetector 632, as necessary, in order to produce the compensated result.

An example operation for producing a compensated result of a MVM, with respect to FIG. 6, is as follows. The optical crossbar array 300 is operated as described previously to produce a set of output optical signals, with the $j^{th}$ photodetector outputting a signal of the form described in Equation (2b). The photodetector outputs thus collectively produce an output vector $\underset{\sim}{z}$, which may be referred to as a raw output vector. Concurrently, the PCM (or other attenuation) devices of the compensation device are operated to pass a minimum amount of optical signal, noting that the minimum amount is a proportion b of optical signal provided thereto, according to the PCM device limitations as described above with respect to FIG. 5. Therefore, the compensation output optical signal has an intensity of:

$$b\sum_{i=1}^{m} x_i. \tag{3}$$

The photodetector 632 outputs an electrical signal proportional to the compensation output optical signal, and this electrical signal can be referred to as a compensation value. The output of the photodetector 632 may then be subtracted from the output of each photodetector 216 using the readout device. This subtraction can be performed in the analog or digital domain. For example, the photodetector 632 may operate substantially as half of a BPD with respect to each of the photodetectors 216, or the outputs can be digitized and subtracted using digital signal processing, or the like. As can be seen by subtracting Equation (3) from Equation (2b), the result of this operation is a vector which is proportional to the desired result vector y. Dividing the result of the subtraction by the scalar value a recovers the result vector y, which can also be referred to as a compensated result. The division may be implemented using the multiplier 634, for example.

In various embodiments, the readout device of 211 of FIG. 2 may similarly be configured, for example by use of a multiplier 634 to divide the output of the BPDs by the scalar value a to recover the result vector y from the BPD outputs, which are given by Equation (2a). Other compensation operations may be performed as required on outputs of the optical crossbar array 200 or 300, where such operations can be linear, nonlinear, or a combination thereof, based on what is required to recover the result vector y.

In some embodiments, the compensation value (e.g. in optical, digital electronic or analog electronic form) can be stored and re-used in multiple computations. The multiple computations can involve two or more different outputs (e.g. at different times) of a same optical crossbar array, or different outputs (e.g. at the same time) of two or more different optical crossbar arrays. In some embodiments, an analog memory can be used to store the compensation value, and the compensation value can be retrieved from the analog memory for reuse. Such reuse may be useful when a same vector (or matrix column) is used as a multiplier with different matrix multiplicands. This may occur for example when a large matrix is decomposed into blocks, each block to be multiplied by a same vector as parts of a larger MVM. Storing and reusing the compensation value may provide for a more efficient compensation operation, a more consistent compensation operation, or both.

Figure 7:
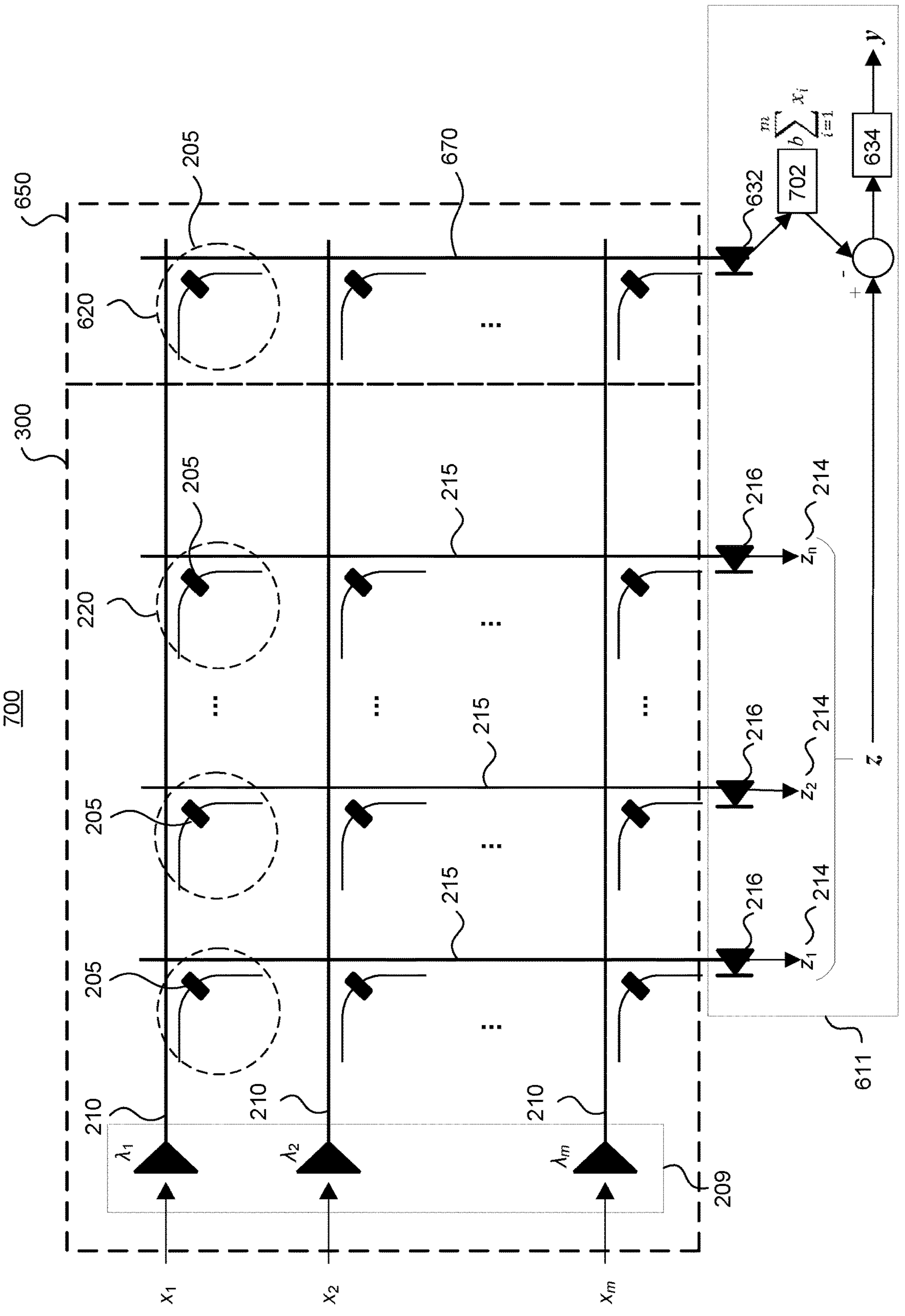
FIG. 7 illustrates a variation of the device of FIG. 6, in which an analog memory element is added for compensation result re-use, according to an embodiment of the present disclosure.

FIG. 7 illustrates an embodiment of the present disclosure in which the compensation value is stored in analog memory 702. The apparatus 700 is similar to the apparatus 600 of FIG. 6, except for the inclusion of this analog memory 702. A vector x is used to generate input optical signals which are passed to an optical crossbar array 300 and a compensation device 650. The readout device receives outputs from the optical crossbar array 300 and the compensation device 650 and produces an indication of the multiplication result y=xC (a first compensated result) based on these outputs. The output from the compensation device 650 is also stored in the analog memory 702. Next, the same vector x may be used to generate input optical signals which are again passed to an optical crossbar array 300, which this time represents elements of a different matrix D. The readout device this time receives outputs from the optical crossbar array 300 and the analog memory 702 and produces an indication of the multiplication result y=xD (a second compensated result) based on these outputs. This process can be repeated. Matrices C and D may be submatrices (partitions) of a larger overall matrix.

Figure 8:
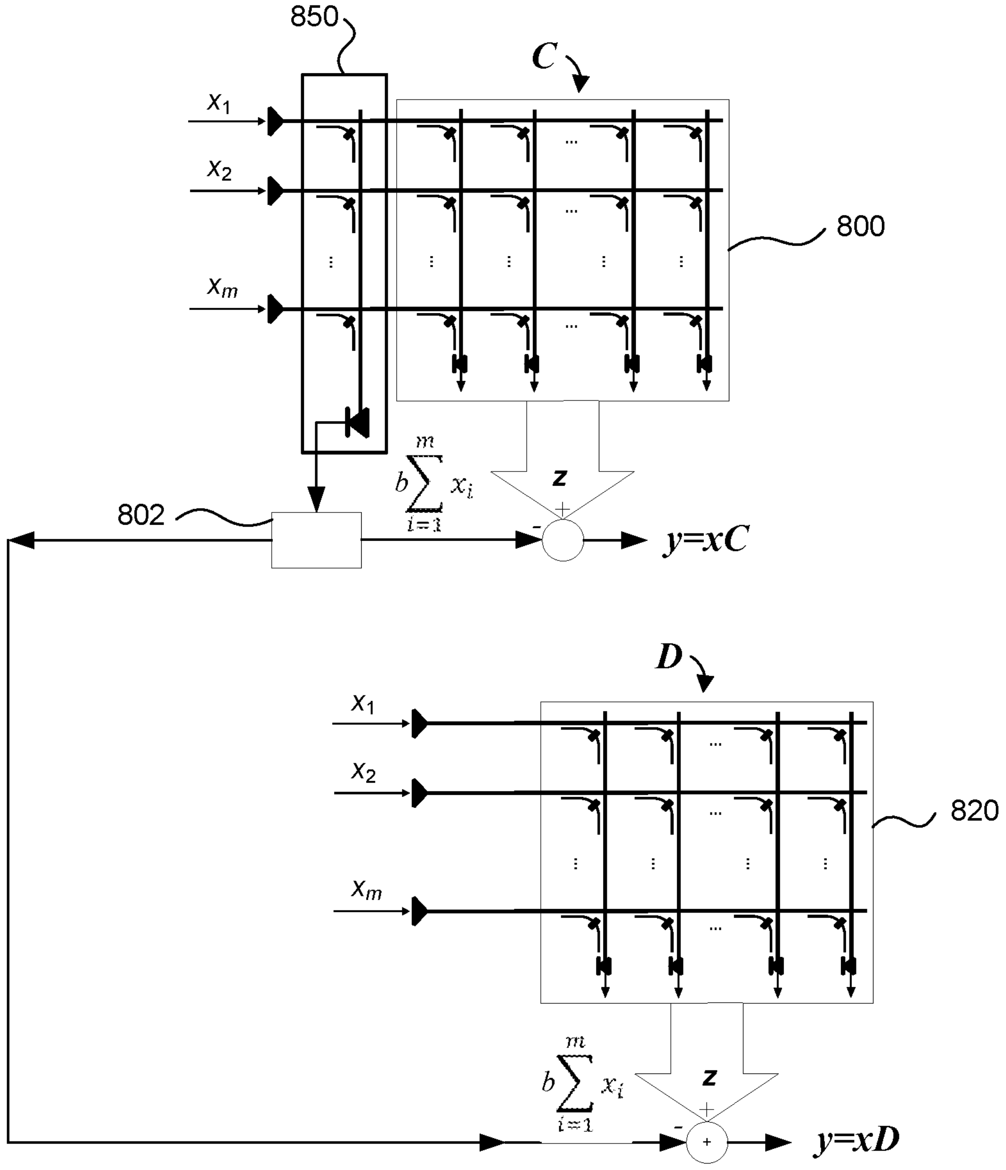
FIG. 8 illustrates another variation of the device of FIG. 6, in which an analog memory element is added for compensation result re-use, according to an embodiment of the present disclosure.

FIG. 8 illustrates another embodiment of the present disclosure in which the compensation value is stored in analog memory 802. A vector x is used to generate input optical signals which are passed to an optical crossbar array 800 and a compensation device 850. The readout device receives outputs from the optical crossbar array 800 and the compensation device 850 and produces an indication of the multiplication result y=xC (a first compensated result) based on these outputs. The output from the compensation device 850 is also stored in the analog memory 802. Concurrently or at a different time, the same vector x is used to generate input optical signals which are passed to another optical crossbar array 820, which is configured to represent elements of a different matrix D. The readout device receives outputs from the optical crossbar array 820 and the analog memory 802 and produces an indication of the multiplication result y=xD (a second compensated result) based on these outputs. Matrices C and D may be different submatrices (partitions) of a larger overall matrix. It is noted that the optical crossbar arrays 800 and 820 may have a same configuration, and may be co-fabricated, so that the attenuation devices have same or similar characteristics and response parameters a and b.

It is noted that, throughout this disclosure, some scalar parameters (e.g. a and b) are dealt with explicitly, while others are dealt with implicitly. For example, as discussed above, each processing element obtains and operates on only a portion of an input optical signal. Also as discussed above, optical representations (e.g. attenuation or absorption values) of matrix elements may be normalized. Optical representations of vector elements (e.g. input optical signal intensities) may also be normalized so that they are relative to a predetermined maximum value. The electrical output of a photodetector is also in proportion to its input optical signal via some relationship. For simplicity, it is assumed that these scalar parameters and constants of proportionality are known, for example through design, calibration, observation, or a combination thereof, and that they are accounted for in computations. In some embodiments, such scalar parameters may be compensated for via embodiments of the present disclosure, in addition to or alternatively to compensation of the parameters a and b of the attenuation devices.

Embodiments of the present disclosure provide for a method and apparatus for representing negative elements in an input vector acting as a multiplier in an optical crossbar array, such as the optical crossbar arrays 200 and 300 of FIGS. 2 and 3. As can be readily appreciated, the optical crossbar arrays 200 and 300 of FIGS. 2 and 3 use light intensity to represent elements in the input vector, for example by producing light having an intensity proportional to the elements $x_1, x_2, \ldots x_m$. However, intensity of light is an intrinsically positive value, and as such negative entries cannot be directly represented in this manner. By providing an approach for representing negative entries in a multiplier vector, embodiments of the present disclosure provide for a more widely applicable apparatus for optically implementing MVM. An electronic controller can be used in implementing these approaches, for example by adjusting elements of input vectors and input matrices as described below.

Figure 10:
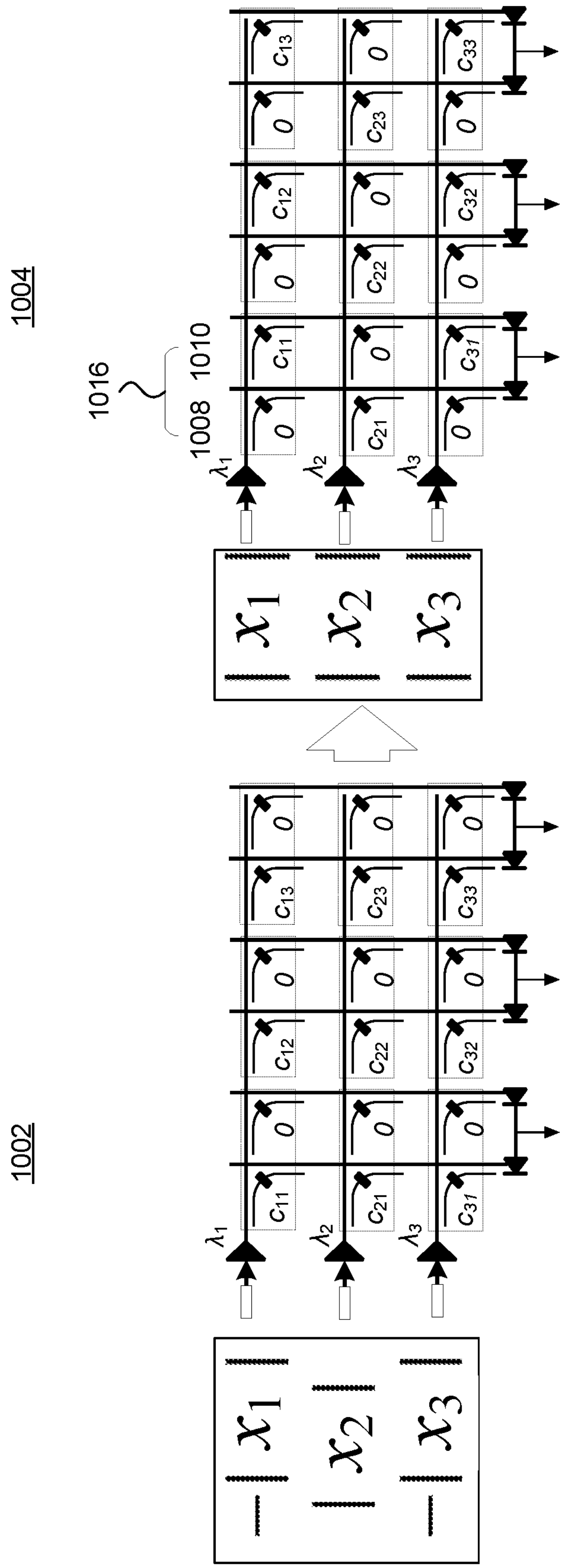
FIG. 10 illustrates an architecture to process, using a crossbar array, multiplier vectors having negative elements, according to an embodiment of the present disclosure.

FIG. 9 and FIG. 10 illustrate embodiments of the present disclosure in which a vector having some negative-valued elements may be used as an input vector (e.g., multiplier x 904) for a multiplication operation involving an optical crossbar array, such as the optical crossbar array 200 of FIG. 2. As discussed previously, for computations performed using an optical crossbar array, the elements of the input vector 904 (which may be a row or column of a matrix) may be encoded as a light intensity which implies that, without further measures taken, only positive-values (absolute values) elements can be encoded. However, as illustrated in FIG. 9 and FIG. 10, embodiments are provided to facilitate both positive and negative entries of a multiplier input vector being supported in calculations utilizing PCM crossbar arrays. The left-hand side 902 of FIG. 9 illustrates how the input vector 904 can include negative values, for example as the first and third elements. Without modifications, this may lead to an impractical implementation as shown in the left-hand side 1002 of FIG. 10 which might not be implemented when the input vector 904 is encoded using light intensity, which cannot be negative. However, the negative-valued inputs can be supported if the negative signs of input vector elements 904 are incorporated instead into the signs of corresponding elements of the multiplicand matrix C 906 of the MVM. This is provided that the optical crossbar array can handle negative-valued elements of an input matrix (multiplicand), for example by using the implementation of FIG. 2.

The right-hand side 922 of FIG. 9 illustrates an embodiment in which the elements of the multiplicand matrix C 906 may be modified (to $\hat{C}$ 926) to reverse the sign of certain elements based on the presence of negative-valued elements of the multiplier 904. Instead of setting the input vector provided to the optical crossbar array as the multiplier vector x 904, the input vector to the optical crossbar array is set to the (element-wise) absolute value of x, i.e. $|x|$. Instead of setting the input matrix provided to the optical crossbar array as the multiplicand matrix C 906, the input matrix provided to the optical crossbar array is set to $\hat{C}$ 926. A rule for deriving $\hat{C}$ 926 from C 906 and x 904 is as follows. If the $i^{th}$ element of x is negative, then the $ij^{th}$ element of $\hat{C}$ is set equal to the $ij^{th}$ element of C, multiplied by negative one. Otherwise, the $ij^{th}$ element of $\hat{C}$ is set equal to the $ij^{th}$ element of C.

As can be seen with respect to FIG. 10, the above can be implemented in practice by swapping the values to be implemented by the $ij^{th}$ pair of processing elements, whenever the $i^{th}$ element of x is negative. In FIG. 10, by way of example, one of each pair of processing elements (e.g. 1016) implements a zero value, which is one approach for implementing the optical processing array 200. Also by way of example, each entry of C is assumed to be positive. The left-hand side 1002 also shows the hypothetical implementation for the original multiplicand C.

In more detail with respect to FIG. 10, the left-hand side 1002 implements a hypothetical (non-practical) implementation in which certain input signals are negative. The right-hand side 1004 implements the approach of the right-hand side 922 of FIG. 9. As mentioned above, and also referring to FIG. 2, the optical processing array includes several processing element pairs 1016, each cooperatively representing a signed element of an input matrix. The input optical signals are generated based on the entries of $|x|$. The values of processing elements (e.g. 1008 and 1010) of a processing element pair 1016 are swapped when the corresponding element of the original multiplier vector x is negative.

Therefore, according to embodiments, there is provided a method and apparatus involving an optical crossbar array for multiplication, which is capable of representing both positive and negative valued entries of a matrix multiplicand. A vector multiplier having both positive and negative entries is used to generate to a revised vector multiplier having only positive entries, where the entries of the revised vector multiplier are equal to the absolute values of the corresponding entries of the vector multiplier. The revised vector multiplier is then represented using intensities of input optical signals provided to the optical crossbar array. A matrix multiplicand is used to generate a revised matrix multiplicand using a rule as described above, namely to implement that: if the $i^{th}$ element of the original vector multiplier is negative, then the $ij^{th}$ element of the revised matrix multiplicand is set equal to the $ij^{th}$ element of the original matrix multiplicand, multiplied by negative one. Otherwise, the $ij^{th}$ element of the revised matrix multiplicand is set equal to the $ij^{th}$ element of the original matrix multiplicand. The optical crossbar array then operates to multiply the revised vector multiplier with the revised matrix multiplicand, as described elsewhere herein for example with respect to FIG. 2.

For the optical crossbar array of FIG. 2, or similar optical crossbar arrays, implementing that the $ij^{th}$ element of the revised matrix multiplicand is set equal to the $ij^{th}$ element of the original matrix multiplicand, multiplied by negative one can involve swapping the values represented by each member of a corresponding pair of attenuation devices (e.g. PCM devices). That is, suppose two processing elements in a processing element pair would represent a matrix element $c_{ij}$ in the original matrix multiplicand by controlling the processing elements so that a first (e.g. leftmost) processing element of the pair passes a first controllable fraction $f_1(ij)$ of light provided thereto, a second (e.g. rightmost) processing element of the pair passes a second controllable fraction $f_2(ij)$ of light provided thereto, and ideally $c_{ij}=f_1(ij)-f_2(ij)$. Then these same two processing elements may be controlled to represent the negative of the same matrix element $-c_{ij}$ in the revised matrix multiplicand by controlling the processing elements so that, instead, the second (e.g. rightmost) processing element of the pair passes the first controllable fraction $f_1(ij)$ of light provided thereto, the first (e.g. leftmost) processing element of the pair passes the second controllable fraction $f_2(ij)$ of light provided thereto, and ideally $-c_{ij}=f_2(ij)-f_1(ij)$. One of $f_1(ij)$ and $f_2(ij)$ may be set equal to zero. An advantage of the above-described configuration is that multipliers with both negative and positive elements can be represented using the architecture of FIG. 2, or more generally in which light intensity is used to represent vector multipliers. The approach is efficient as no additional hardware is required, but only an additional preparation step to evaluate multipliers and adjust multiplier and multiplicand controls based on the signs of elements in the multipliers. The same hardware can be used to represent both multipliers with only positive (or only negative) elements, and multipliers with both positive and negative elements.

Figure 11:
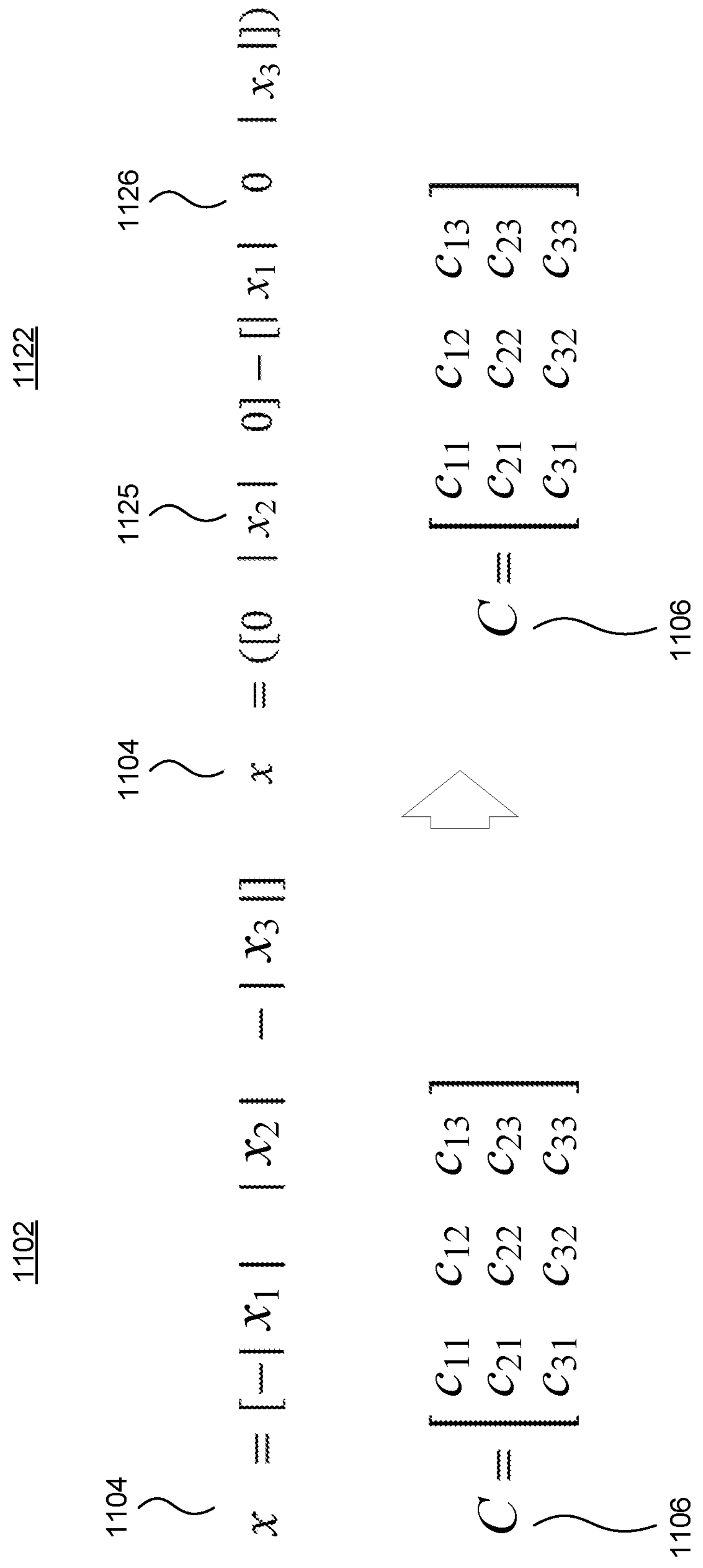
FIG. 11 illustrates expressions in relation to an approach for handling negative elements of a multiplier vector, according to another embodiment of the present disclosure.
Figure 12:
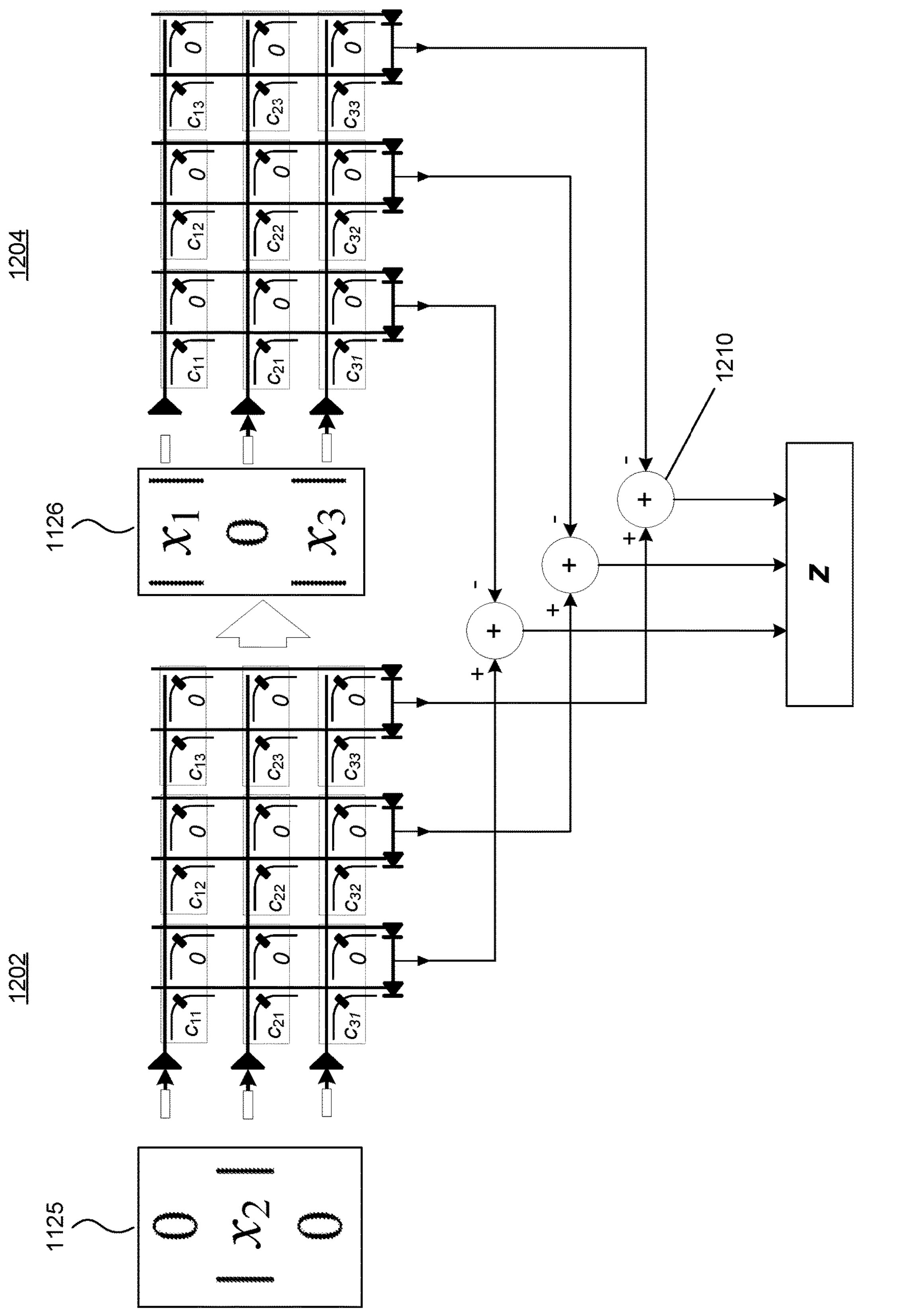
FIG. 12 illustrates an architecture to process, using a crossbar array, multiplier vectors having negative elements, according to another embodiment of the present disclosure.

FIG. 11 and FIG. 12 illustrate embodiments of the present disclosure in which a vector having some negative-valued elements may be used as an input vector (e.g., multiplier x 1104) for a multiplication operation involving an optical crossbar array, such as the optical crossbar array 200 of FIG. 2 or the optical crossbar array 300 of FIG. 3. Thus, such embodiments can potentially also be used in an apparatus which only supports matrix multiplicands having all positive (or all negative) entries. Accordingly, these embodiments can be combined with the embodiments which implement a compensation device to compensate for non-ideal characteristics of attenuation elements, as described elsewhere herein.

According to such embodiments, a multiplier vector x, which is signed, can be represented as a difference between two unsigned multiplier vectors. A first one of the unsigned multiplier vectors (also referred to as a first partial vector) can have its $i^{th}$ entry set to $\max\{x_i, 0\}$, where $x_i$ is the $i^{th}$ entry of the original multiplier vector x. A second one of the unsigned multiplier vectors (also referred to as a second partial vector) can have its $i^{th}$ entry set to $\min\{-x_i, 0\}$. (Other implementations can be used, for example with zero being replaced by another value.) Then, the difference between the unsigned multiplier vectors is equal to the original multiplier vector x. Furthermore, the difference between: the product of the first unsigned multiplier and the multiplicand; and the second unsigned multiplier and the same multiplicand, is equal to the product of the original multiplier and the multiplicand. Thus, two multiplications are performed, either by using the same optical crossbar array twice (e.g. at two separate times or at the same time but using wavelength division multiplication techniques) or by using two different optical crossbar arrays. The first multiplication is between the first unsigned multiplier vector and the matrix multiplicand, while the second multiplication is between the second unsigned multiplier vector and the same matrix multiplicand. The results of the first multiplication and the second multiplication are then subtracted to obtain the final result. The subtraction can be performed in the optical domain, or in the electrical domain either as a digital or analog subtraction. An analog subtraction may be implemented for example by using BPDs.

An input splitting device, such as an electronic controller, can be used to decompose the multiplier vector into the first and second unsigned multiplier vectors. The input splitting device can then provide the two unsigned multiplier vectors as inputs to two optical crossbar arrays, or to the same optical crossbar array at different times or for representation via optical signals of different wavelengths at the same time. A readout device can be configured to receive the results of the first and second multiplications and perform the required subtraction to produce a final result.

FIG. 11 and FIG. 12 illustrate embodiments of the present disclosure in which a vector having some negative-valued elements may be used as an input vector (e.g., multiplier x 904) for a multiplication operation involving an optical crossbar array, such as the optical crossbar array 200 of FIG. 2 or the optical crossbar array 300 of FIG. 3. As discussed previously, for computations performed using an optical crossbar array, the elements of the input vector 1104 (which may be a row or column of a matrix) may be encoded as a light intensity which implies that, without further measures taken, only positive-values (absolute values) elements can be encoded. However, as illustrated in FIG. 11 and FIG. 12, embodiments are provided to facilitate both positive and negative entries of a multiplier input vector being supported in calculations utilizing PCM crossbar arrays. The left-hand side 1102 of FIG. 11 illustrates how the input vector 1104 can include negative values, for example as the first and third elements. Without modifications, this may lead to an impractical implementation as shown in the left-hand side 1202 of FIG. 12 which might not be implemented when the input vector 1104 is encoded using light intensity, which cannot be negative. However, the negative-valued inputs can be supported if the input vector 1104 is separated into two unsigned (i.e. having all positive valued elements) multiplier (input) vectors 1125 and 1126 having a difference equal to the input vector 1104. This is shown on the right hand side 1122. It is noted that the multiplicand matrix C 1106 remains unchanged in this embodiment. This is provided that the optical crossbar array can handle negative-valued elements of an input matrix (multiplicand), for example by using the implementation of FIG. 2 or FIG. 3.

FIG. 12 illustrates a pair of multiplications, using one or a pair of optical crossbar arrays, performed using the two unsigned multiplier vectors and the same multiplicand matrix, with the difference between the two multiplication results being subtracted, according to an embodiment of the present disclosure. Although the optical crossbar array is illustrated as being similar to the optical crossbar array of FIG. 2, in another embodiment the optical crossbar array of FIG. 3 may be used instead. The left-hand side 1202 illustrates multiplication of the first unsigned multiplier vector 1125 with the multiplicand matrix C, and the right-hand side 1204 illustrates multiplication of the second unsigned multiplier vector 1126 with the multiplicand matrix C. The two multiplications can be performed using the same optical crossbar array or using different optical crossbar arrays. Differences between the outputs are computed, for example in the electronic domain using subtraction circuits 1210 (e.g. of the readout device) and the computed differences are provided as the result z, which may be interpreted as the ultimate result y or used to compute the ultimate result y.

An advantage of the above-described configuration is that multipliers with both negative and positive elements can be represented using the architecture of FIG. 2 or FIG. 3, or more generally in which light intensity is used to represent vector multipliers. The approach is simple to implement. The same hardware can be used to represent both multipliers with only positive (or only negative) elements, and multipliers with both positive and negative elements.

Figure 13:
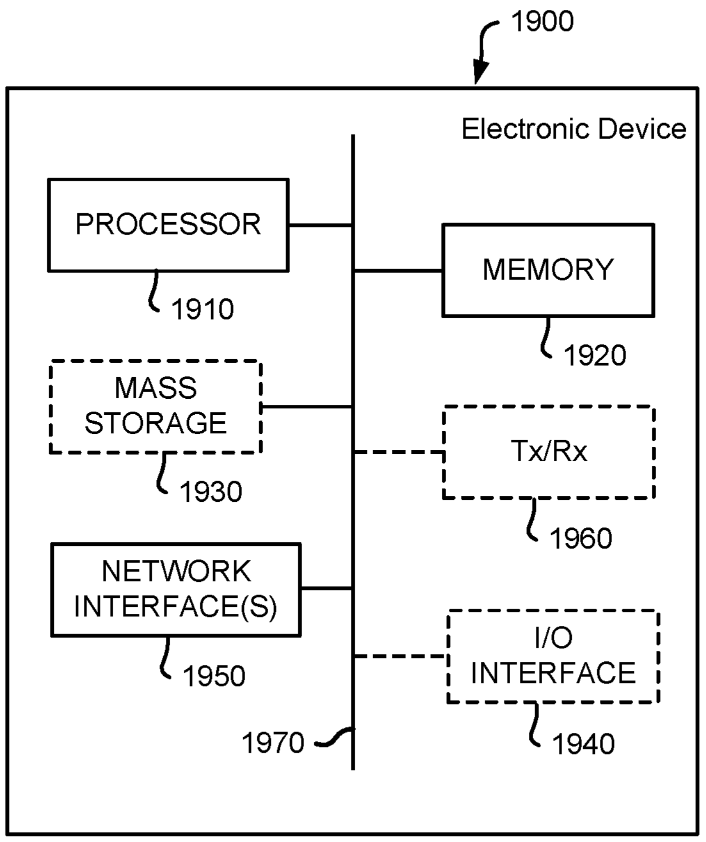
FIG. 13 is a schematic diagram of an electronic device, according to embodiments of the present disclosure.

FIG. 13 is a schematic diagram of an electronic device 1900 that may act as a controller or interface for embodiments of the present disclosure as described herein. For example, network infrastructure devices, end-user computers, smartphones, physical machines or servers, or other computing devices can be configured as the electronic device. It is also noted that controllers directing operations of embodiments of the present disclosure may be microcontrollers or microprocessors which execute program instructions stored in-memory, or other digital or analog circuitry, or a combination thereof.

As shown, the device includes a processor 1910, such as a Central Processing Unit (CPU) or specialized processors such as a Graphics Processing Unit (GPU) or other such processor unit, memory 1920, non-transitory mass storage 1930, I/O interface 1940, network interface 1950, and a transceiver 1960, all of which are communicatively coupled via bi-directional bus 1970. According to certain embodiments, any or all of the depicted elements may be utilized, or only a subset of the elements. Further, the device 1900 may contain multiple instances of certain elements, such as multiple processors, memories, or transceivers. Also, elements of the hardware device may be directly coupled to other elements without the bi-directional bus.

The memory 1920 may include any type of non-transitory memory such as static random access memory (SRAM), dynamic random access memory (DRAM), synchronous DRAM (SDRAM), read-only memory (ROM), any combination of such, or the like. The mass storage element 1930 may include any type of non-transitory storage device, such as a solid state drive, hard disk drive, a magnetic disk drive, an optical disk drive, USB drive, or any computer program product configured to store data and machine executable program code. According to certain embodiments, the memory 1920 or mass storage 1930 may have recorded thereon statements and instructions executable by the processor 1910 for performing any of the aforementioned method steps described above.

It will be appreciated that, although specific embodiments of the technology have been described herein for purposes of illustration, various modifications may be made without departing from the scope of the technology. The specification and drawings are, accordingly, to be regarded simply as an illustration of the disclosure as defined by the appended claims, and are contemplated to cover any and all modifications, variations, combinations or equivalents that fall within the scope of the present disclosure. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. An apparatus comprising:

an optical crossbar array comprising:

a set of input waveguides each configured to propagate a different respective one of a set of input optical signals, each one of the set of input optical signals having an intensity representative of a corresponding element of an input vector;

a set of output waveguides each configured to provide a different respective one of a set of output optical signals; and a set of processing elements each configured to receive a portion of one of the set of input optical signals and to pass a respective controllable fraction of said portion to one of the set of output waveguides, the controllable fractions being based on values of elements of an input matrix to be multiplied with the input vector, each one of the set of output optical signals comprising multiple ones of the controllable fractions;

a compensation device configured to receive further portions of each one of the set of input optical signals from the set of input waveguides, and generate a compensation output optical signal having an intensity proportional to a sum of intensities of said further portions; and a readout device configured to:

receive the set of output optical signals;

receive the compensation output optical signal; and provide a compensated result of a multiplication between the input vector and the input matrix, the compensated result being generated based at least in part on the set of output optical signals and the compensation output optical signal.

2. The apparatus of claim 1, wherein the compensation device comprises:

a plurality of further processing elements each configured to receive a different one of the further portions and pass a fixed part or all of said different one of the further portions to a further output waveguide, to generate the compensation output optical signal within the further output waveguide.

3. The apparatus of claim 2, wherein each one of the processing elements and each one of the further processing elements has an identical structure, within manufacturing tolerances.

4. The apparatus of claim 2, wherein each one of the processing elements and the further processing elements comprises a phase change material (PCM).

5. The apparatus of claim 1, wherein providing the compensated result of the multiplication between the input vector and the input matrix comprises:

generating an indication of a raw output vector based on the set of output optical signals;

generating an indication of a compensation value based on the compensation output optical signal; and generating the compensated result to represent a scaled result of a difference between: the raw output vector; and the compensation value or the compensation value multiplied by a predetermined scalar value.

6. The apparatus of claim 5, wherein the scaled result corresponds to said difference multiplied by another predetermined scalar value, and wherein the predetermined scalar value, the other predetermined scalar value, or both, are determined using a calibration operation performed on the apparatus.

7. The apparatus of claim 1, wherein the apparatus is further configured to:

generate, using the optical crossbar array or another optical crossbar array having a same configuration as the optical crossbar array, a second set of output optical signals indicative of a result of multiplying the input vector with a second input matrix; and provide a second compensated result of a multiplication between the input vector and the second input matrix, the second compensated result being generated based at least in part on the second set of output optical signals and the compensation output optical signal.

8. The apparatus of claim 7, wherein the compensation output optical signal, or an indication thereof, is stored in and subsequently retrieved from a memory to support generating the compensated result, generating the second compensated result, or both.

9. The apparatus of claim 7, wherein the input matrix and the second input matrix are different partitions of an overall matrix.

10. The apparatus of claim 1, wherein the input vector is a row or column of a further input matrix, the apparatus configured to perform a matrix-to-matrix multiplication by multiplying each of two or more rows or columns of the further input matrix with the input matrix.

11. A method comprising:

operating an optical crossbar array comprising:

a set of input waveguides each configured to propagate a different respective one of a set of input optical signals, each one of the set of input optical signals having an intensity representative of a corresponding element of an input vector;

a set of output waveguides each configured to provide a different respective one of a set of output optical signals; and a set of processing elements each configured to receive a portion of one of the set of input optical signals and to pass a respective controllable fraction of said portion to one of the set of output waveguides, the controllable fractions being based on values of elements of an input matrix to be multiplied with the input vector, each one of the set of output optical signals comprising multiple ones of the controllable fractions;

operating a compensation device to: receive further portions of each one of the set of input optical signals from the set of input waveguides; and generate a compensation output optical signal having an intensity proportional to a sum of intensities of said further portions; and operating a readout device to:

receive the set of output optical signals;

receive the compensation output optical signal; and provide a compensated result of a multiplication between the input vector and the input matrix, the compensated result being generated based at least in part on the set of output optical signals and the compensation output optical signal.

12. The method of claim 11, wherein operating the compensation device comprises:

operating a plurality of further processing elements to receive a different one of the further portions and pass a fixed part or all of said different one of the further portions to a further output waveguide, to generate the compensation output optical signal within the further output waveguide.

13. The method of claim 12, wherein each one of the processing elements and each one of the further processing elements has an identical structure, within manufacturing tolerances.

14. The method of claim 12, wherein each one of the processing elements and the further processing elements comprises a phase change material (PCM).

15. The method of claim 11, wherein providing the compensated result of the multiplication between the input vector and the input matrix comprises:

generating an indication of a raw output vector based on the set of output optical signals;

generating an indication of a compensation value based on the compensation output optical signal; and generating the compensated result to represent a scaled result of a difference between: the raw output vector; and the compensation value or the compensation value multiplied by a predetermined scalar value.

16. The method of claim 15, wherein the scaled result corresponds to said difference multiplied by another predetermined scalar value, and wherein the predetermined scalar value, the other predetermined scalar value, or both, are determined using a calibration operation performed on the apparatus.

17. The method of claim 11, further comprising:

generating, using the optical crossbar array or another optical crossbar array having a same configuration as the optical crossbar array, a second set of output optical signals indicative of a result of multiplying the input vector with a second input matrix; and providing a second compensated result of a multiplication between the input vector and the second input matrix, the second compensated result being generated based at least in part on the second set of output optical signals and the compensation output optical signal.

18. The method of claim 17, further comprising storing the compensation output optical signal, or an indication thereof, in a memory, and subsequently retrieving the compensation output optical signal, or the indication thereof from the memory, to support generating the compensated result, generating the second compensated result, or both.

19. The method of claim 17, wherein the input matrix and the second input matrix are different partitions of an overall matrix.

20. The method of claim 11, wherein the input vector is a row or column of a further input matrix, the method further comprising performing a matrix-to-matrix multiplication by multiplying each of two or more rows or columns of the further input matrix with the input matrix.

* * * * *